| United States Patent [19] | [11] Patent Number: 4,897,451 |
|---|---|
| Nakagawa et al. | [45] Date of Patent: Jan. 30, 1990 |

[54] CHLOROSULFONATED POLYETHYLENE

[75] Inventors: Tatsushi Nakagawa; Yoshiaki Ishida; Junichiro Kanesaska; Yosuke Kaneshige, all of Yamaguchi, Japan

[73] Assignee: Toyo Soda Manufacturing Co., Ltd., Yamaguchi, Japan

[21] Appl. No.: 73,652

[22] Filed: Jul. 15, 1987

[30] Foreign Application Priority Data

Jul. 15, 1986 [JP] Japan ................................. 61-164662

[51] Int. Cl.$^4$ ........................ C08F 8/38; C08L 23/34
[52] U.S. Cl. .................................... 525/192; 525/194; 525/333.9; 525/334.1
[58] Field of Search ................... 525/192, 333.9, 334.1

[56] References Cited

U.S. PATENT DOCUMENTS

| 3,110,709 | 11/1963 | Canterino | 525/334.1 |
|---|---|---|---|
| 3,489,642 | 1/1970 | Heuse | 525/192 |
| 4,280,940 | 7/1981 | Klug et al. | 525/192 |
| 4,591,621 | 5/1986 | Ennis | 525/333.9 |
| 4,663,396 | 5/1987 | Nakagawa et al. | 525/333.9 |
| 4,727,114 | 2/1988 | Chen | 525/192 |

FOREIGN PATENT DOCUMENTS

| 877376 | 8/1971 | Canada . | |
|---|---|---|---|
| 0133294 | 2/1985 | European Pat. Off. . | |
| 57-102936 | 6/1982 | Japan | 525/240 |
| 57-128730 | 8/1982 | Japan | 525/240 |
| 940197 | 10/1963 | United Kingdom . | |
| 847164 | 9/1970 | United Kingdom . | |
| 2127028 | 4/1984 | United Kingdom . | |
| 2127833 | 4/1984 | United Kingdom . | |

*Primary Examiner*—Carman J. Seccuro
*Attorney, Agent, or Firm*—Sughrue, Mion, Zinn, Macpeak & Seas

[57] ABSTRACT

A chlorosulfonated polyethylene is disclosed, having a bimodal molecular weight distribution and containing from 10 to 60 wt % chlorine and from 0.2 to 3.0 wt % sulfur. The chlorosulfonated polyethylene of the invention is less temperature-dependent in terms of viscosity and displays improved processability.

2 Claims, 6 Drawing Sheets

EXAMPLE 1

FIG.3

EXAMPLE 1

FIG.5

EXAMPLE 2

FIG. 4

FIG.6
EXAMPLE 3

FIG.7
EXAMPLE 3

FIG.8
COMPARATIVE EXAMPLE 1

FIG.9

COMPARATIVE EXAMPLE 1

FIG.10

COMPARATIVE EXAMPLE 2

CHLOROSULFONATED POLYETHYLENE

FIELD OF THE INVENTION

The present invention relates to a chlorosulfonated polyethylene. More particularly, the present invention relates to a chlorosulfonated polyethylene that has good processability because of the small dependence of its viscosity on temperature.

BACKGROUND OF THE INVENTION

Chlorosulfonated polyethylene is a halogenated elastomer having no double bonds. Chloroprene rubber is also a halogenated elastomer, but chlorosulfonated polyethylene which is more resistant to heat, weather and ozone is regarded as a speciality elastomer that ranks above chloroprene rubber. Notwithstanding its superior characteristics, chlorosulfonated polyethylene has not gained as large a market share as chloroprene rubber. One reason for this limited commercial exploitation of chlorosulfonated polyethylene is that it is a difficult-to-process elastomer and that its processability is much inferior to that of chloroprene rubber. The following are major drawbacks encountered in processing chlorosulfonated polyethylene: (1) during mixing with an open roll mill, the rubber sticks to the rolls to reduce the operational efficiency; (2) the same problem occurs in making rubber coated fabrics with calender rolls and, in addition, air will be entrapped in the product to increase the reject rate of final products; and (3) after mixing in a Banbury mixer, the rubber compound cannot be readily recovered since it sticks to the rotor.

Under these circumstances, rubber processors who handle chlorosulfonated polyethylene usually improve its processability by means of addition of processing aids such as metal soaps (e.g., calcium stearate), polyhydric alcohols, low-molecular weight polyethylene, fatty acid esters and waxes. However, attempts to improve the processability of chlorosulfonated polyethylene by the agency of such additives have their own limits and abuse of these additives will cause undesirable phenomena such as blooming on the product surface and insufficient adhesion. Therefore, it has been desired to improve the processability of chlorosulfonated polyethylene not by the addition of chemicals but through the modification of the nature of the polymer itself.

SUMMARY OF THE INVENTION

An object, therefore, of the present invention is to improve the processability of chlorosulfonated polyethylene. The studies conducted by the present inventors to attain this object started with their recognition that the aforementioned defects of conventional chlorosulfonated polyethylene could be ascribed to the fact that the viscosity of this polymer is highly dependent on temperature. Therefore, the studies of the present inventors were addressed to a method for decreasing the temperature dependence of the viscosity of chlorosulfonated polyethylene and the present invention has been accomplished as a result of these efforts.

According to the findings of the present inventors, the aforementioned object of the present invention can be attained by a chlorosulfonated polyethylene that has a bimodal molecular weight distribution and which contains chlorine and sulfur in respective amounts of from 10 to 60 wt % and from 0.2 to 3.0 wt %. This polymer can be produced by first preparing a polyethylene having a bimodal molecular weight distribution and then chlorinating and chlorosulfonating this polyethylene so that it has chlorine and sulfur contents of from 10 to 60 wt % and from 0.2 to 3.0 wt %, respectively.

DETAILED DESCRIPTION OF THE INVENTION

The term "bimodal molecular weight distribution" as used herein means a molecular weight distribution that has two peak tops, one for the lower molecular weight portion and the other for the higher molecular weight portion. In this sense, a bimodal molecular weight distribution is distinguished from a single-mode distribution having a single peak top.

Molecular weight distribution is commonly determined by GPC and the bimodal molecular weight distribution as determined by this method is hereunder defined more specifically, with special comments being made on the difference between bimodal distribution and single-mold distribution having a shoulder.

Single-mode distribution

An elution curve has only one maximum value.

Bimodal distribution

An elution curve has two maximum values with one minimum value occurring therebetween.

Figure 1:
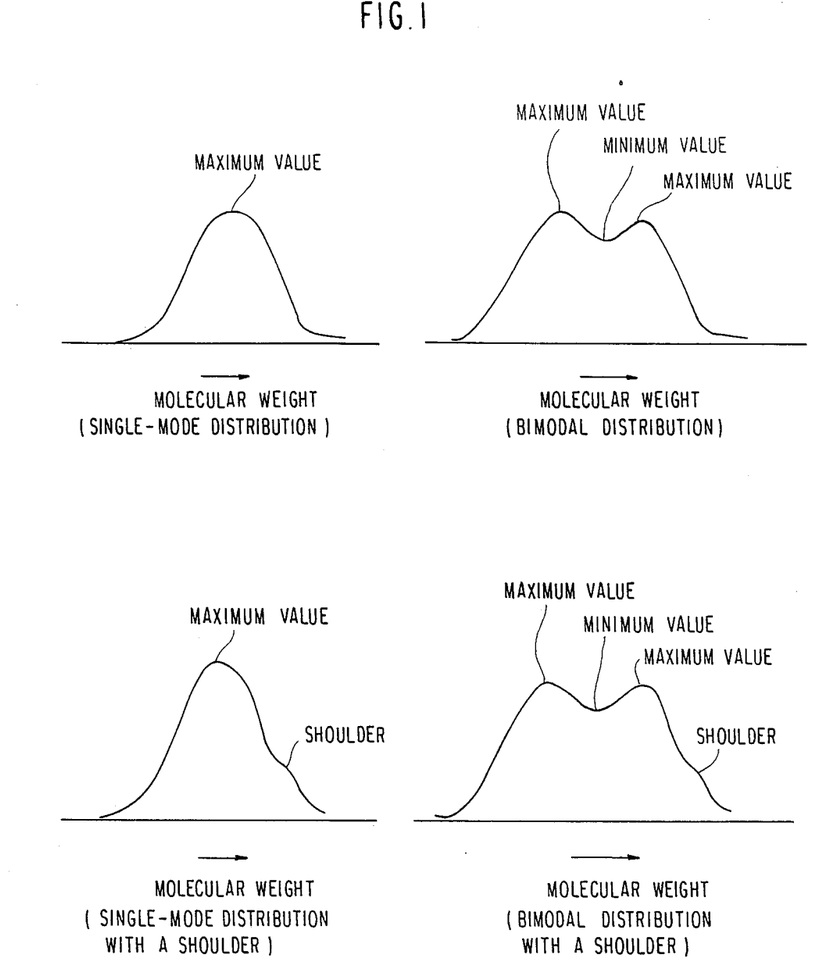
FIG. 1 shows conceptually two different profiles of molecular weight distribution, one being bimodal and the other single-mode.

Difference between single-mode distribution with a shoulder and bimodal distribution In a single-mode distribution with a shoulder, only the line tangent to an elution curve at the maximum value has a slope of zero and the line tangent to the curve at the shoulder is not zero. In a bimodal distribution, each of the lines tangent to an elution curve at the first maximum value, the intermediate minimum value and the second maximum value has a slope of zero. This is the point that distinguishes the single-mode distribution with a shoulder from the bimodal distribution. Typical elution curves that show four different molecular weight distributions according to these definitions are drawn in FIG. 1.

The lower molecular weight portion of a bimodal distribution is to be distinguished from the higher molecular weight portion by the molecular weight corresponding to the minimum value which occurs between the two maxima on the elution curve. A preferred molecular weight distribution contains two peaks that provide for clear-cut separation between the lower molecular weight portion and the higher molecular weight portion.

The molecular weight itself of the chlorosulfonated polyethylene does not constitute a characteristic feature of the present invention. What is important is the shape of the molecular weight distribution of the polymer. Polymers having a bimodal molecular weight distribution as defined hereinabove generally have large values of $\overline{Mw}/\overline{Mn}$ ($\overline{Mw}$, weight-average molecular weight; $\overline{Mn}$, number-average molecular weight) which is a measure of the molecular weight distribution. However, the chlorosulfonated polyethylene of the present invention cannot be appropriately characterized by its $\overline{Mw}/\overline{Mn}$ since some of the polymers having a single-mode molecular weight distribution are broad in their molecular weight distribution and have large values of $\overline{Mw}/\overline{Mn}$. Again it is important that the chlorosulfonated polyethylene of the present invention is bimodal in the shape of its molecular weight distribution.

The chlorosulfonated polyethylene of the present invention has a chlorine content of from 10 to 60 wt %, preferably from 20 to 45 wt %, and a sulfur content of from 0.2 to 3.0 wt %, preferably from 0.4 to 1.6 wt %.

The sulfur content of chlorosulfonated polyethylene is a measure of the quantity of chlorosulfone groups present and serves as a factor that governs the behavior of vulcanization in such respects as cure rate and curing density. A particularly preferable range for the sulfur content of chlorosulfonated polyethylene is from 0.8 to 1.2 wt %.

The temperature dependency of the viscosity of the chlorosulfonated polyethylene of the present invention can be determined by measuring the temperature dependency of its Mooney viscosity ($ML_{1+4}$). For instance, the Mooney viscosity of the polymer is measured at 100° C. and 150° C. and the difference is determined. The smaller the difference, the less dependent on temperature the polymer is. Generally speaking, a polymer whose absolute value of the Mooney viscosity at 100° C. is small (e.g., $ML_{1+4}$ at 100° C. $\leqq 20$) has a small differential Mooney viscosity, and a polymer whose absolute value of the Mooney viscosity at 100° C. is great (e.g., $ML_{1+4}$ at 100° C. $\geqq 80$) has a large differential Mooney viscosity. It is therefore inappropriate to compare the absolute values of differences in the temperature-dependent change of Mooney viscosity. Instead, the present inventors have devised the following formula for expressing the temperature dependency of Mooney viscosity:

$$X = \frac{(\text{Mooney viscosity at } 100° \text{ C.}) - (\text{Mooney viscosity at } 150° \text{ C.})}{(\text{Mooney viscosity at } 100° \text{ C.})}$$

A chlorosulfonated polyethylene with $X \leqq 0.50$ has a small temperature dependency of viscosity and one with $X > 0.50$ has a large temperature dependency of viscosity. Commercial products of chlorosulfonated polyethylene have X values exceeding 0.50, while commercially available chloroprene rubber has an X value of 0.50 or below.

The chlorosulfonated polyethylene of the present invention is characterized by an X value of 0.50 or below. A chlorosulfonated polyethylene having a bimodal molecular weight distribution can be produced by chlorinating and chlorosulfonating a polyethylene having a bimodal molecular weight distribution.

A chlorosulfonated polyethylene having a bimodal molecular weight distribution can of course be prepared from a polyethylene that has an inherent bimodal molecular weight distribution; alternatively, the desired polyethylene may be prepared from a mixture of a low-molecular weight polyethylene and a high-molecular weight polyethylene. In this latter case, too, it is preferable that the low-molecular weight portion of the mixed polyethylene is sharply separated from the high-molecular weight portion.

As already mentioned, what is important for the purposes of the present invention is that the chlorosulfonated polyethylene should have a bimodal molecular weight distribution, and the value of its molecular weight or $\overline{Mw}/\overline{Mn}$ itself is not important.

Polyethylenes having a bimodal weight distribution are generally broad in their molecular weight distribution, so that they have large values of $\overline{Mw}/\overline{Mn}$ or melt flow ratio ($MI_{21.6}/MI_{2.16}$), the latter being discussed in Unexamined Published Japanese Patent Application No. 149604/85. These values, however, are not appropriate for characterization of the polymer of the present invention since even a polyethylene having a single-mode molecular weight distribution may present a large value of $\overline{Mw}/\overline{Mn}$ or melt flow ratio if it has a broad molecular weight distribution. It should be remembered that the bimodality of the shape of molecular weight distribution is important for the present invention. This is based on the fact that the shape of the molecular weight distribution of chlorosulfonated polyethylene depends not on the specific conditions of reaction but on the shape of the molecular weight distribution of the starting polyethylene. Stated in simple words, a polyethylene having a single-mode molecular weight distribution will exhibit a single-mode distribution even after it has been transformed to a chlorosulfonated form, and a polyethylene having a bimodal molecular weight distribution will exhibit the same modality in a chlorosulfonated polyethylene. Needless to say, the absolute value of the molecular weight of the chlorosulfonated polyethylene will vary with the specific conditions of reaction for producing it but this is not very important for the purposes of the present invention.

The term "polyethylene" as used herein shall be construed as meaning not only an ethylene homopolymer but also an ethylene copolymer composed of ethylene and no more than 10 mol % of an appropriate comonomer. Illustrative comonomers include butene-1, propylene, pentene-1, 4-methylpentene-1, octene-1, hexene-1, vinyl acetate, acrylic acid and an acrylic acid ester. A preferable polyethylene is a high-density polyethylene, with one having a melt index of from 0.03 to 10 g/10 min and a density of from 0.948 to 0.962 g/cc being particularly preferable.

An illustrative method of producing chlorosulfonated polyethylene from polyethylene by its chlorination and chlorosulfonation consists of dissolving the polyethylene in a solvent and reacting the solution either with chlorine and sulfurous acid gases and/or sulfuryl chloride or with sulfuryl chloride alone in the presence of a radical initiator catalyst, with a cocatalyst being optionally used.

Illustrative solvents that can be used in this reaction include carbon tetrachloride, chloroform, tetrachloroethane, monochlorobenzene and benzene, all of these solvents being inert to halogenation.

Illustrative radical initiators that can be used are azo-based radical initiators such as $\alpha,\alpha'$-azobisisobutyronitrile and azobiscyclohexane carbonitrile, peroxides such as benzoyl peroxide and acetyl peroxie, and ultraviolet radiation.

Illustrative cocatalysts are amine compounds such as pyridine and quinoline.

After completion of the reaction, the solution is freed of any residual acids such as hydrogen chloride gas and sulfurous acid gas. Thereafter, an epoxy-based stabilizer is added to the solution and a desirable stabilizer is 2,2′-bis(4-glycidyloxyphenyl)propane.

Chlorosulfonated polyethylene may be separated from the reaction solution and dried by any of the known methods listed below.

(1) Steam distillation:

The polymer solution is fed into hot water so as to separate the solvent by steam distillation, followed by drying the residue (see, for example, U.S. Pat. No. 2,592,814).

(2) Drum drying:

The polymer solution is fed onto the surface of a heated rotating drum, with the polymer being recovered as a film (see, for example, U.S. Pat. No. 2,923,979); and (3) Extrusion drying:

The polymer solution is dried with an extrusion drier either directly or after preliminary concentration (see, for example, Unexamined Published Japanese Patent Application No. 47303/82).

It should however be mentioned that the process for producing chlorosulfonated polyethylene in the practice of the present invention is by no means limited to the method described above and other methods may be employed such as performance of reaction with polyethylene suspended in a solvent or reaction in a vapor phase.

The resulting chlorosulfonated polyethylene is mixed with a suitable chemical such as a curing agent, a curing accelerator, a reinforcing agent, a filler, a plasticizer, a softening agent or an antioxidant and the mix is subsequently vulcanized. If desired, the chlorosulfonated polyethylene may be immediately used without being vulcanized.

Curing agents commonly used with chlorosulfonated polyethylene include magnesia; litharge; tribasic lead maleate; calcium hydroxide; metal oxides such as calcium oxide; epoxy resins; polyhydric alcohols; and polyvalent amines.

Illustrative curing accelerators include sulfureous compounds such as TRA (dipentamethylene thiuram tetrasulfide), TT (tetramethyl thiuram disulfide) and ethylene thiourea; peroxides such as DCP (dicumyl peroxide); and maleimides such as PM (N,N′-m-phenylenedimaleimide).

Illustrative reinforcing agents and fillers are carbon black, clay, talc, silica, calcium carbonate and titanium oxide.

Illustrative plasticizers and softening agents are phthalic acid esters, sebacic acid esters, and a variety of oils. Usable antioxidants are NBC (nickel dibutyldithiocarbamate), amine compounds, and phenolic compounds.

The chemical additives that can be incorporated in the chlorosulfonated polyethylene of the present invention are by no means limited to those listed above. The rubber compound prepared by mixing the chlorosulfonated polyethylene with suitable additives is immediately put to use without being vulcanized; alternatively, it may be vulcanized by various methods such as press curing, steam curing, UHF curing and electron-beam curing. Final products into which the rubber compound can be processed include hoses for conveying LP gas, hoses for conveying city gas, electric wires, automotive hoses, handrails of escalators, raincoats, windbreakers, rubber boats, bags, shaped articles, belts, and boots.

The chlorosulfonated polyethylene prepared according to the present invention is far less temperature-dependent in viscosity than the conventional chlorosulfonated polyethylene and, hence, has the following advantages:

(1) It expands the temperature range over which rolling operations can be performed, so that the rubber compound can be worked smoothly on rolls without extensive sticking of the compound to the rolls;

(2) It is amenable to operations with calender rolls with minimal incidence of sticking to the rolls and air entrapment; and (3) The rubber compound can be smoothly discharged after mixing in a Banbury mixer.

A vulcanized product of the chlorosulfonated polyethylene prepared in accordance with the present invention has physical properties comparable to those of the conventional chlorosulfonated polyethylene. Therefore, the chlorosulfonated polyethylene of the present invention can be used in the same fields of application as those of the conventional polyethylene such as electric wires, hoses, rubber-coated fabrics, and various industrial parts.

The present invention is hereunder described in greater detail with reference to the following examples, which are given for illustrative purposes only and are by no means intended to limit the present invention. Various measurements were conducted by the following methods:

Polyethylene
Melt index: JIS K 7210
Density: JIS K 7112
Molecular weight measurement by GPC: See below.
Chromatograph: Waters GPC/150C (Waters Instruments, Inc.)
Column: Two units of GMH-HT (Toyo Soda Manufacturing Co., Ltd.)
Solvent: Orthodichlorobenzene
Flow rate: 1.0 ml/min
Temperature: 140° C.
Sample concentration: 0.1%
Detector: RI detector
Calibration curve: Based on standard polystyrenes (NBS polyethylene SRM 1482, 1483, and 1484 were used for examination) available from Toyo Soda Manufacturing Co., Ltd.
Molecular weight calculation: Molecular weight of standard polystyrene (Q factor: 17.7) multiplied by 0.428
Chlorosulfonated polyethylene
Chlorine and sulfur content analyses: combustion flask method
Mooney viscosity: JIS K 6300
Molecular weight measurement by GPC: See below.
Chromatograph: HLC 802A of Toyo Soda Manufacturing Co., Ltd.
Column: Two units of GMH6 connected to a single unit of XL, both available from Toyo Soda Manufacturing Co., Ltd.
Solvent: Tetrahydrofuran
Flow rate: 1.2 ml/min
Pressure: 44 - 45 kg/cm$^2$
Temperature: 38° C.
Sample concentration: 0.10 wt %
Detector: RI detector Calibration curve: Based on standard polystyrene available from Toyo Soda Manufacturing Co., Ltd.
Molecular weight calculation: Use the molecular weight of standard polystyrene.
Physical properties of vulcanized rubber: JIS K 6301

EXAMPLE 1

A high-density polyethylene having a melt index of 0.05 g/10 min and a density of 0.951 g/cc was used as a starting polyethylene. A GPC chromatogram of this polyethylene is shown in FIG. 2, and the weight average and number average molecular weights ($\overline{Mw}$, $\overline{Mn}$) of the polyethylene are noted in Table 1, together with its molecular weight distribution ($\overline{Mw}/\overline{Mn}$).

Figure 2:
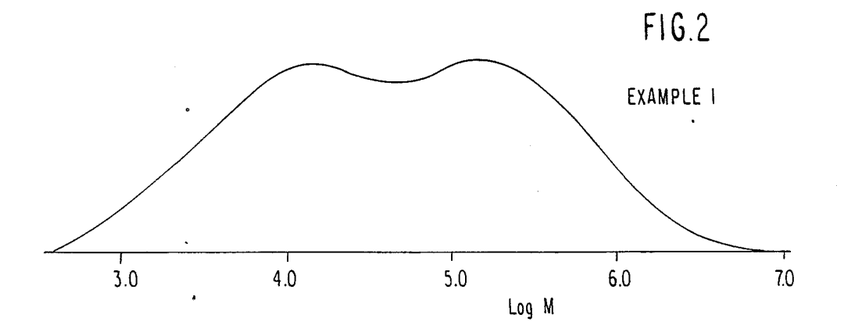
FIG. 2 is a gel permeation chromatography (GPC) chromatogram of polyethylene.

As is clear from FIG. 2, the starting polyethylene had a bimodal molecular weight distribution.

A 30-liter glass-lined autoclave equipped with a stirrer was charged with 1.68 kg of polyethylene and 28 kg of solvent carbon tetrachloride and a uniform solution was formed by heating at 110° C. under pressure.

Thereafter, the autoclave was cooled to 100° C. and charged with 0.26 g of pyridine as a cocatalyst. Reaction was initiated by charging 3,650 g of sulfuryl chloride into the autoclave as it was continuously fed with 2.3 g of α,α'-azobisisobutyronitrile (radical generator) and 2.8 kg of a carbon tetrachloride solution. It took 2 hours to complete the addition of sulfuryl chloride, during which the reaction temperature and pressure were held at 100° C. and 2.8 kg/cm$^2$, respectively. After completion of the reaction, the autoclave was cooled to 70° C. and nitrogen was blown into the reaction solution at atmospheric pressure so as to remove any residual hydrogen chloride and sulfurous acid gases.

To the reaction solution, 30 g of 2,2'-bis(4-glycidyloxyphenyl)propane was added as a stabilizer and the mixture was fed into a drum drier so as to separate the reaction product.

Analysis showed that the resulting chlorosulfonated polyethylene contained 35.2 wt % chlorine and 1.3 wt % sulfur.

TABLE 1

|  | Weight average molecular weight ($\overline{Mw}$) | Number average molecular weight ($\overline{Mn}$) | $\overline{Mw}/\overline{Mn}$ |
| --- | --- | --- | --- |
| Example 1 | 2.2 × 10$^5$ | 8.5 × 10$^3$ | 26 |
| Example 2 | 2.2 × 10$^5$ | 8.5 × 10$^3$ | 26 |
| Example 3 | 2.0 × 10$^5$ | 1.2 × 10$^4$ | 17 |
| Comparative Example 1 | 1.1 × 10$^5$ | 2.0 × 10$^4$ | 6 |
| Comparative Example 2 | 7.6 × 10$^4$ | 1.1 × 10$^4$ | 7 |

Figure 3:
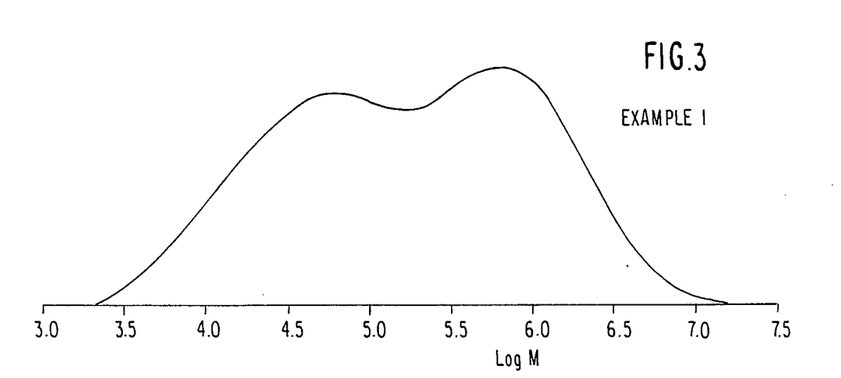
FIG. 3 is a GPC chromatogram of chlorosulfonated polyethylene.

An elution curve of the chlorosulfonated polyethylene subjected to GPC for determination of molecular weight distribution is depicted in FIG. 3, and analytical data thereof in Table 2. As one can see from FIG. 3, the chlorosulfonated polyethylene had a bimodal molecular weight distribution. The values of $\overline{Mw}$, $\overline{Mn}$ and $\overline{Mw}/\overline{Mn}$ of chlorosulfonated polyethylene calculated as from the GPC chromatogram of polyethylene differed from the found values because of the differences between the conditions of GPC analysis performed on polyethylene and chlorosulfonated polyethylene. The temperature dependency of the Mooney viscosity of the chlorosulfonated polyethylene is shown in Table 3 in terms of measured values, and shown graphically in FIG. 4. The value of X of this chlorosulfonated polyethylene was 0.34, indicating the small temperature dependency of its Mooney viscosity.

TABLE 2

|  | Weight average molecular weight ($\overline{Mw}$) | Number average molecular weight ($\overline{Mn}$) | $\overline{Mw}/\overline{Mn}$ |
| --- | --- | --- | --- |
| Example 1 | 6.3 × 10$^5$ | 3.5 × 10$^4$ | 18 |
| Example 2 | 5.8 × 10$^5$ | 3.2 × 10$^4$ | 18 |
| Example 3 | 6.5 × 10$^5$ | 4.5 × 10$^4$ | 14 |
| Comparative Example 1 | 3.0 × 10$^5$ | 6.5 × 10$^4$ | 5 |
| Comparative Example 2 | 2.4 × 10$^5$ | 4.8 × 10$^4$ | 5 |

TABLE 3

|  | ML$_{1+4}$ 100° C. | ML$_{1+4}$ 150° C. | X* |
| --- | --- | --- | --- |
| Example 1 | 87 | 57 | 0.34 |
| Example 2 | 67 | 44 | 0.34 |
| Example 3 | 120 | 74 | 0.38 |
| Comparative Example 1 | 106 | 45 | 0.58 |
| Comparative Example 2 | 61 | 20 | 0.67 |

$$*X = \frac{(\text{Mooney viscosity at 100° C.}) - (\text{Mooney viscosity at 150° C.})}{(\text{Mooney viscosity at 100° C.})}$$

A rubber compound was prepared according to the formulation indicated in Table 4.

TABLE 4

| Components | Parts by weight |
| --- | --- |
| Chlorosulfonated polyethylene | 100 |
| Magnesia | 5 |
| SRF carbon black | 50 |
| Dioctylsebacic acid | 20 |
| AC polyethylene 617A | 3 |
| Suntight ® | 2 |
| Splender R300 ® | 2 |
| Pentaerythritol | 3 |
| TRA | 2 |
| NBC | 3 |
| PM | 3 |
| Total | 193 |

These components were mixed by the following two methods A and B.

Method A

Mixing in an open roll (10 inchφ) mill.

Method B

Chlorosulfonated polyethylene, magnesia, SRF carbon black, dioctylsebacic acid, AC polyethylene, Suntight ®, and Splender R300 ® were mixed in a 3.6l Banbury mixer, and the resulting mix was fed into an open roll (10 inchφ) mill where it was further blended with pentaerythritol, TRA, NBC and PM.

In the mixing by method A, no part of the rubber compound stuck to the rolls which therefore could be operated efficiently. The resulting compound was presscured at 150° C. for 40 minutes. Physical properties of the cured product were measured and the results are shown in Table 5.

In the mixing by method B, the rubber compound could be smoothly discharged from the Banbury mixer without sticking to the rotor. Subsequent operation with rolls was also smooth. The results are also shown in Table 5.

TABLE 5

| | Rolling operation (method A) | Discharge- ability from Banbury mixer (method B) | $H_S$ (JIS A) | Properties in ordinary state | | | Thermal* aging resist- ance | | Oil** resist- ance $\Delta V$ (%) | Compression*** set (%) |
| --- | --- | --- | --- | --- | --- | --- | --- | --- | --- | --- |
| | | | | $T_B$ (kg/cm²) | $E_B$ (%) | $M_{100}$ (kg/cm²) | $\Delta H_S$ | $\Delta E_B$ | | |
| Example 1 | good | good | 67 | 215 | 240 | 51 | +1 | −9 | 40 | 47 |
| Example 2 | good | good | 68 | 223 | 210 | 59 | +2 | −8 | 55 | 48 |
| Example 3 | good | good | 68 | 198 | 200 | 73 | +4 | −5 | 41 | 46 |
| Comparative Example 1 | good | poor | 67 | 201 | 240 | 50 | +2 | −10 | 41 | 49 |
| Comparative Example 2 | poor | bad | 67 | 207 | 230 | 52 | +2 | −9 | 40 | 49 |

*120° C. × 70 hours
**120° C. × 70 hours
***120° C. × 22 hours

EXAMPLE 2

An additional sample of chlorosulfonated polyethylene was produced by repeating Example 1 except that the amount of sulfuryl chloride added to the reaction system was changed to 2,893 g, with the amount of cocatalyst pyridine also changed to 0.21 g.

Analysis showed that the resulting chlorosulfonated polyethylene contained 29.8 wt % chlorine and 0.9 wt % sulfur.

Figure 5:
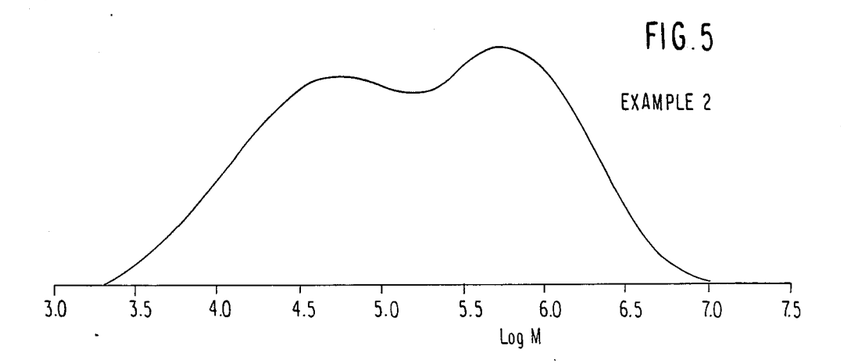
FIGS. 5 to 11 are GPC chromatograms of polyethylene (FIGS. 6, 8 and 10) and chlorosulfonated polyethylene (FIGS. 5, 7, 9 and 11).

A GPC chromatogram of the chlorosulfonated polyethylene is depicted in FIG. 5, and the $\overline{Mw}$, $\overline{Mn}$ and $\overline{Mw}/\overline{Mn}$ data thereof in Table 2. One can see that the chlorosulfonated polethylene had a bimodal molecular weight distribution.

Figure 4:
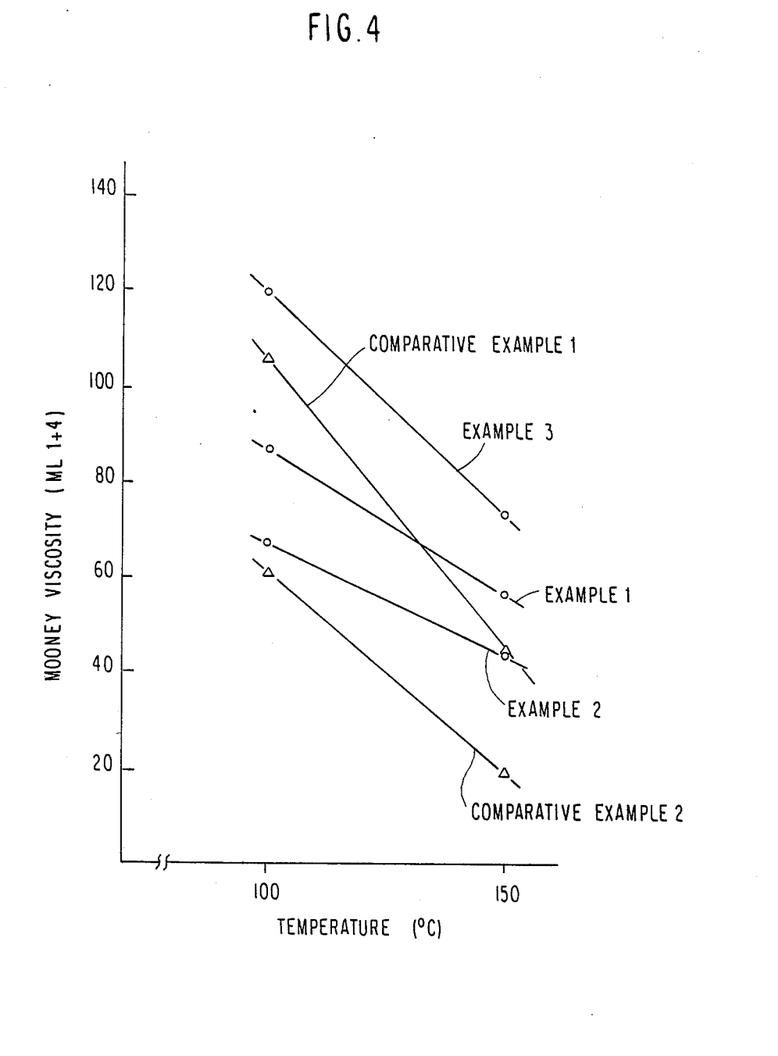
FIG. 4 is a graph showing the temperature dependence of the Mooney viscosities of various chlorosulfonated polyethylenes.

The temperature dependency of the Mooney viscosity of the chlorosulfonated polyethylene is shown in Table 3 and FIG. 4. The value of X of this chlorosulfonated polyethylene was 0.34, indicating the small temperature dependency of its Mooney viscosity.

A rubber compound was prepared according to the formulation shown in Table 4 and as in Example 1, the components were mixed by methods A and B. The chlorosulfonated polyethylene exhibited good processability in either method. The compounds prepared by the two methods were vulcanized as in Example 1 and subjected to measurement of various physical properties. The results are summarized in Table 5.

EXAMPLE 3

An additional sample of chlorosulfonated polyethylene was produced by repeating Example 1 except that the starting polyethylene was a high-density polyethylene with a melt index of 0.03 g/10 min and a density of 0.949 g/cc.

Figure 6:
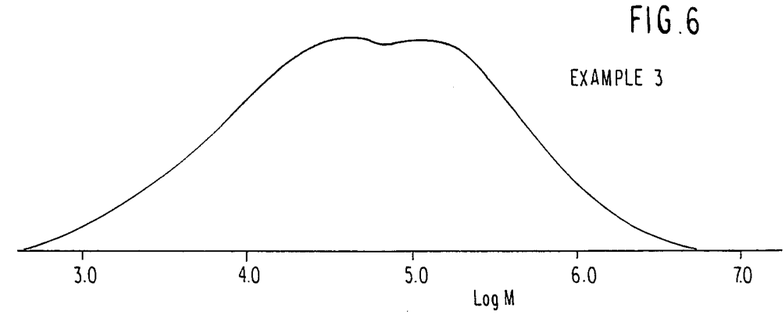

A GPC chromatogram of the starting polyethylene is shown in FIG. 6 and analytical data obtained from this chromatogram is given in Table 1. One can see that the starting polyethylene had a bimodal molecular weight distribution. Analysis showed that the resulting chlorosulfonated polyethylene contained 35.9 wt % Cl and 1.1 wt % S.

Figure 7:
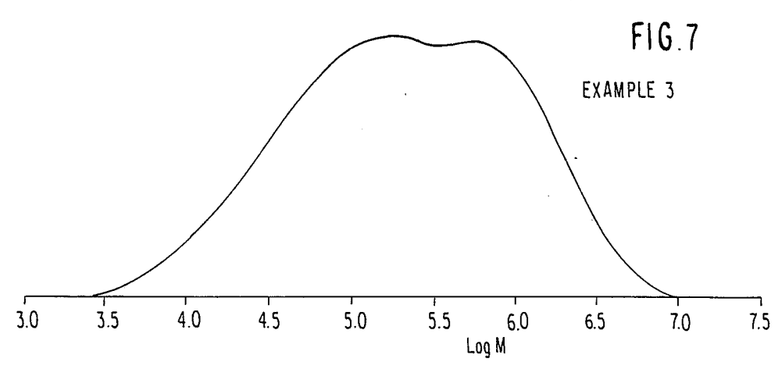

A GPC chromatogram of the chlorosulfonated polyethylene is shown in FIG. 7 and $\overline{Mw}$, $\overline{Mn}$ and $\overline{Mw}/\overline{Mn}$ data thereof in Table 2. One can see that the chlorosulfonated polyethylene had a bimodal molecular weight distribution.

The temperature dependency of the Mooney viscosity of the chlorosulfonated polyethylene is shown in Table 3 and FIG. 4. The value of X of this chlorosulfonated polyethylene was 0.38, indicating the small temperature dependency of its Mooney viscosity.

A rubber compound was prepared according to the formulation shown in Table 4 and as in Example 1, the components were mixed by methods A and B. Smooth processing was achieved in either method. The compounds prepared by the two methods were vulcanized as in Example 1 and subjected to measurement of various physical properties. The results are summarized in Table 5.

COMPARATIVE EXAMPLE 1

A comparative sample of chlorosulfonated polyethylene was produced by repeating Example 1 except that the starting polyethylene was a high-density polyethylene having a melt index of 0.9 g/10 min and 0.953 g/cc.

Figure 8:
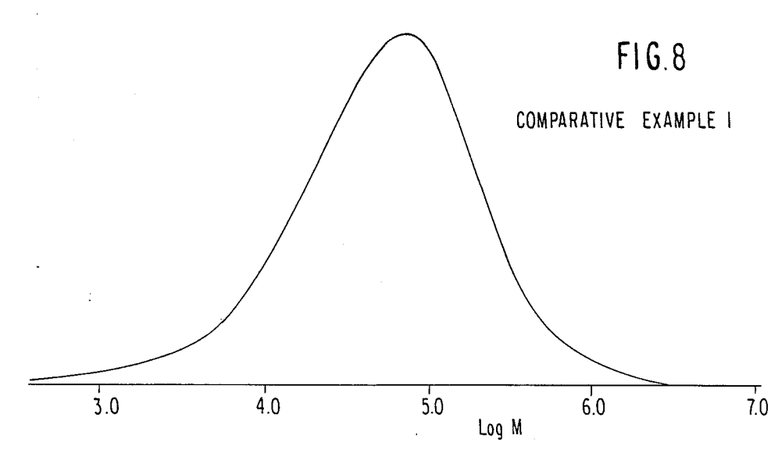

A GPC chromatogram of the starting polyethylene is shown in FIG. 8 and analytical data obtained from this chromatogram is given in Table 1. One can see that the starting polyethylene had a single-mode molecular weight distribution.

Analysis showed that the resulting chlorosulfonated polyethylene contained 35.2 wt % Cl and 1.1 wt % S.

Figure 9:
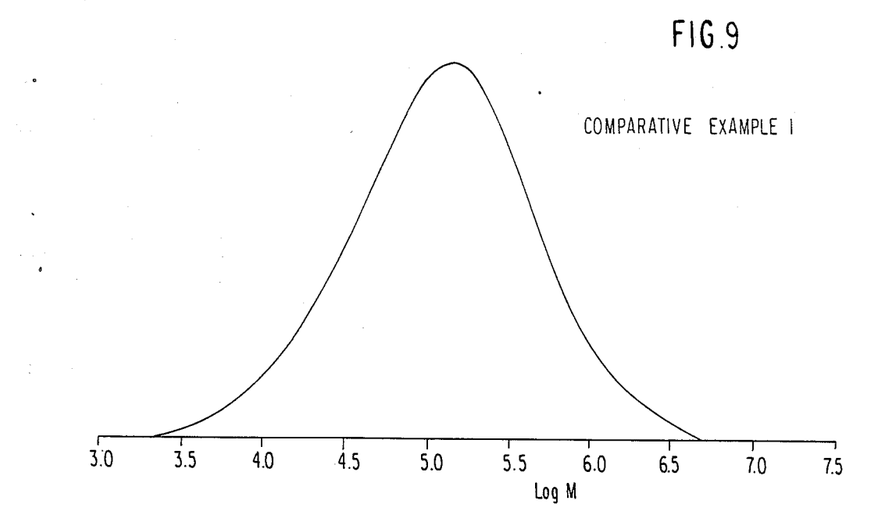

A GPC chromatogram of the chlorosulfonated polyethylene is shown in FIG. 9 and molecular weight related data thereof are given in Table 2. One can see that the chlorosulfonated polyethylene had a single-mode molecular weight distribution.

The temperature dependency of the Mooney viscosity of the chlorosulfonated polyethylene is shown in Table 3 and FIG. 4. The value of X of this chlorosulfonated polyethylene was 0.58, indicating the large temperature dependency of its Mooney viscosity.

A rubber compound was prepared according to the formulation shown in Table 4 and as in Example 1, the components were mixed by methods A and B. Smooth operation was achieved in method A but not so in method B, in which part of the rubber compound got stuck to the periphery of the rotor when it was being discharged from the Banbury mixer.

The compounds prepared by the two methods were vulcanized as in Example 1 and subjected to measurement of various physical properties. The results are summarized in Table 5.

COMPARATIVE EXAMPLE 2

Another comparative sample of chlorosulfonated polyethylene was produced by repeating Example 1 except that the starting polyethylene was a high-density polyethylene having a melt index of 5.5 g/10 min and a density of 0.961 g/cc.

Figure 10:
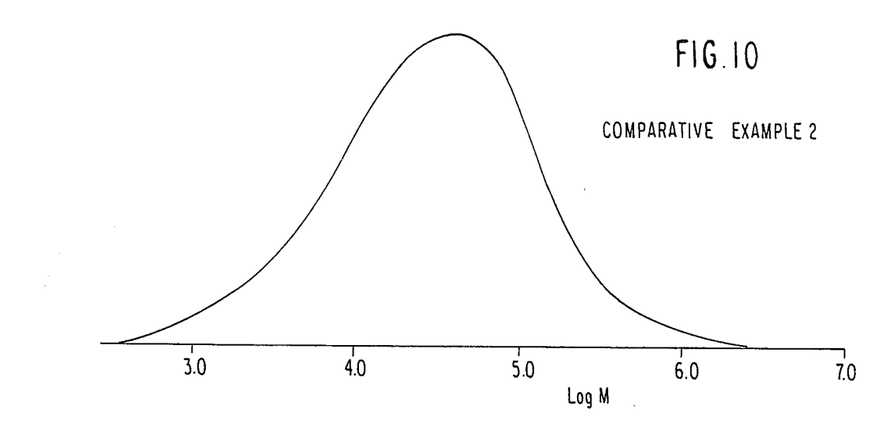

A GPC chromatogram of the starting polyethylene is shown in FIG. 10 and molecular weight related data obtained from this chromatogram are given in Table 1.

One can see that the starting polyethylene had a single-mode molecular weight distribution.

Analysis showed that the resulting chlorosulfonated polyethylene contained 35.6 wt % Cl and 1.1 wt % S.

Figure 11:
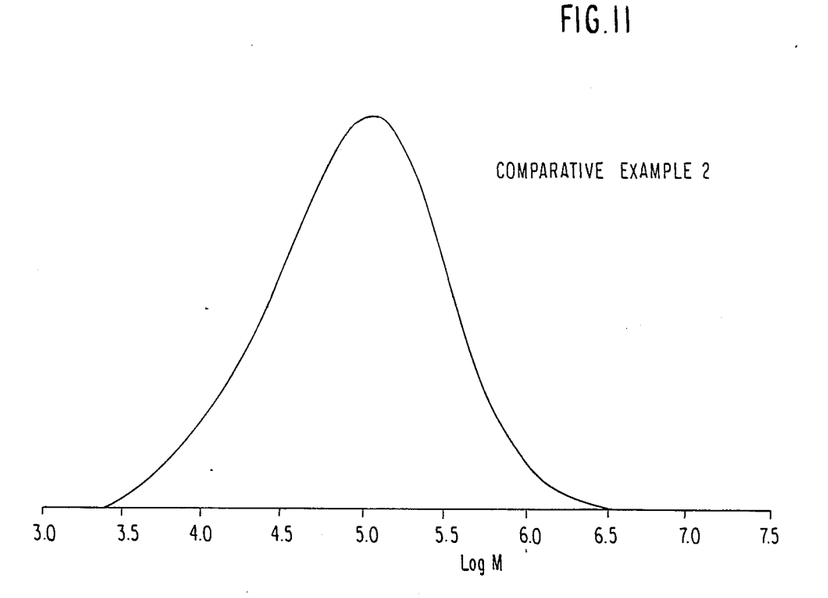

A GPC chromatogram of the chlorosulfonated polyethylene is shown in FIG. 11 and molecular weight related data thereof are given in Table 2. One can see that the chlorosulfonated polyethylene had a single-mode molecular weight distribution.

The temperature dependency of the Mooney viscosity of the chlorosulfonated polyethylene is shown in Table 3 and FIG. 4. The value of X of this chlorosulfonated polyethylene was 0.67, indicating the large temperature dependency of its Mooney viscosity.

A rubber compound was prepared according to the formulation shown in Table 4 and as in Example 1, the components were mixed by methods A and B. The efficiency of operation by method A was low since the rubber compound had a tendency to stick to the rolls. In method B, the rubber compound got stuck onto the periphery of the rotor and could not be discharged smoothly from the Banbury mixer.

The compounds prepared by the two methods were vulcanized as in Example 1 and subjected to measurement of various physical properties. The results are summarized in Table 5.

COMPARATIVE EXAMPLE 3

The temperature dependency of the Mooney viscosity of commercial TOSO-CSM® TS-530 is shown in Table 6.

COMPARATIVE EXAMPLE 4

The temperature dependency of the Mooney viscosity of commercial TOSO-CSM® TS-930 is shown in Table 6.

COMPARATIVE EXAMPLE 5

The temperature dependency of the Mooney viscosity of commercial TOSO-CSM® TS-430 is shown in Table 6.

COMPARATIVE EXAMPLE 6

The temperature dependency of the Mooney viscosity of commercial chlorosulfonated polyethylene (Hypalon® 40) is shown in Table 6.

COMPARATIVE EXAMPLE 7

The temperature dependency of the Mooney viscosity of commercial Hypalon® 4085 is shown in Table 6.

COMPARATIVE EXAMPLE 8

The temperature dependency of the Mooney viscosity of commercial Hypalon® 5839 is shown in Table 6.

COMPARATIVE EXAMPLE 9

The temperature dependency of the Mooney viscosity of commercial Hypalon® 45 is shown in Table 6.

COMPARATIVE EXAMPLE 10

The temperature dependency of the Mooney viscosity of commercial Hypalon® 48 is shown in Table 6.

TABLE 6

| Sample | | $ML_{1+4}$ 100° C. | $ML_{1+4}$ 150° C. | X* |
| --- | --- | --- | --- | --- |
| Comparative Example 3 | TOSO-CSM® TS-530 (chlorosulfonated polyethylene) | 57 | 19 | 0.67 |
| Comparative Example 4 | TOSO-CSM® TS-930 (chlorosulfonated polyethylene) | 108 | 47 | 0.56 |
| Comparative Example 5 | TOSO-CSM® TS-430 (chlorosulfonated polyethylene) | 49 | 15 | 0.69 |
| Comparative Example 6 | Hypalon® 40 (chlorosulfonated polyethylene) | 58 | 19 | 0.67 |
| Comparative Example 7 | Hypalon® 4085 (chlorosulfonated polyethylene) | 101 | 45 | 0.55 |
| Comparative Example 8 | Hypalon® 5839 (chlorosulfonated polyethylene) | 116 | 47 | 0.59 |
| Comparative Example 9 | Hypalon® 45 (chlorosulfonated polyethylene) | 35 | 13 | 0.63 |
| Comparative Example 10 | Hypalon® 48 (chlorosulfonated polyethylene) | 90 | 25 | 0.72 |
| Comparative Example 11 | Denka CSM® 350 (chlorosulfonated polyethylene) | 55 | 18 | 0.67 |
| Comparative Example 12 | Skyprene® B-30 (chloroprene) | 49 | 26 | 0.47 |
| Comparative Example 13 | Skyprene® Y-31 (chloroprene) | 103 | 62 | 0.39 |

$$*X = \frac{\text{(Mooney viscosity at 100° C.)} - \text{(Mooney viscosity at 150° C.)}}{\text{(Mooney viscosity at 100° C.)}}$$

COMPARATIVE EXAMPLE 11

The temperature dependency of the Mooney viscosity of commercial Denka CSM® 350 is shown in Table 6.

COMPARATIVE EXAMPLE 12

The temperature dependency of the Mooney viscosity of a commercial chloroprene rubber product (Skyprene® B-30) is shown in Table 6.

COMPARATIVE EXAMPLE 13

The temperature dependency of the Mooney Viscosity of a commercial chloroprene rubber product (Skyprene® Y-31) is shown in Table 6.

The commercial chlorosulfonated polyethylenes tested in Comparative Examples 3 to 11 had single-mode molecular weight distributions and, as is clear from Table 6, the Mooney viscosities of these chlorosulfonated polyethylenes were highly dependent on temperature (X>0.50).

The commercial chloroprene rubbers tested in Comparative Examples 12 and 13 had X values of no more than 0.50 and the temperature dependency of their Mooney viscosity was small.

From the data shown in Examples 1 to 3 and Comparative Examples 1 to 13, it is clearly evident that the chlorosulfonated polyethylene produced by the present invention is less temperature-dependent in terms of viscosity and displays improved processability.

While the invention has been described in detail and with reference to specific embodiments thereof, it will be apparent to one skilled in the art that various changes and modifications can be made therein without departing from the spirit and scope thereof.

We claim:

1. A chlorosulfonated polyethylene having a bimodal molecular weight distribution of 14 or greater and containing from about 29 to 45 wt % chlorine and from 0.2 to 3.0 wt % sulfur, wherein the chlorosulfonated polyethylene has a Mooney viscosity ($ML_{1+4}$) at 100° C. of from about 67 to 120.

2. A chlorosulfonated polyethylene according to claim 1, which satisfies the following condition:

$$(A-B)/A \leqq 0.50$$

wherein A means the Mooney viscosity ($ML_{1+4}$) at 100° C. and B means the Mooney viscosity ($ML_{1+4}$) at 150° C.

* * * * *